(12) United States Patent
Tan et al.

(10) Patent No.: US 11,965,666 B2
(45) Date of Patent: Apr. 23, 2024

(54) CONTROL METHOD FOR AIR CONDITIONER, AND DEVICE FOR AIR CONDITIONER AND STORAGE MEDIUM

(71) Applicant: Gree Electric Appliances, Inc. of Zhuhai, Guangdong (CN)

(72) Inventors: Jianming Tan, Guangdong (CN); Shaobin Li, Guangdong (CN); Dechao Song, Guangdong (CN); Dong Yue, Guangdong (CN); Chong Chen, Guangdong (CN); Xiaoyu Luo, Guangdong (CN); Jiabi Deng, Guangdong (CN); Pengfei Wang, Guangdong (CN); Wenxuan Xiao, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 419 days.

(21) Appl. No.: 17/600,506

(22) PCT Filed: Dec. 16, 2019

(86) PCT No.: PCT/CN2019/125505
§ 371 (c)(1),
(2) Date: Sep. 30, 2021

(87) PCT Pub. No.: WO2020/199648
PCT Pub. Date: Oct. 8, 2020

(65) Prior Publication Data
US 2022/0205666 A1 Jun. 30, 2022

(30) Foreign Application Priority Data
Apr. 1, 2019 (CN) .......................... 201910258756.9

(51) Int. Cl.
*F24F 11/63* (2018.01)
*G05B 13/02* (2006.01)
*G05B 19/042* (2006.01)

(52) U.S. Cl.
CPC ............ *F24F 11/63* (2018.01); *G05B 13/027* (2013.01); *G05B 19/042* (2013.01); *G05B 2219/2614* (2013.01)

(58) Field of Classification Search
CPC .................. F24F 11/63; G05B 19/042; G05B 2219/2614; G05B 13/027
See application file for complete search history.

(56) References Cited

U.S. PATENT DOCUMENTS

2012/0318011 A1* 12/2012 Ochiai .................. F25B 49/005
62/127
2018/0100662 A1* 4/2018 Farahmand ........ G05B 19/0428

FOREIGN PATENT DOCUMENTS

CN 104932264 A 9/2015
CN 106322656 A 1/2017
(Continued)

OTHER PUBLICATIONS

International Search Report, dated Mar. 13, 2020, in International application No. PCT/CN2019/125505, filed on Dec. 16, 2019.

*Primary Examiner* — Michael W Choi
(74) *Attorney, Agent, or Firm* — McAndrews, Held & Malloy, Ltd.

(57) ABSTRACT

The disclosure provides a control method and a device for an air conditioner. The method includes: a first reward matrix is constructed according to multiple sets of target operating parameters of an air conditioner, a maximum expected benefit of performing a current action in a current state is calculated based on the first reward matrix and a Q-learning algorithm, wherein the current state is represented by a current indoor environment temperature and a current out- (Continued)

door environment temperature; target action parameters under the maximum expected benefit are acquired, and operation of the air conditioner is controlled based on second target action parameters, wherein the second target action parameters at least include a second target operating frequency of the compressor, a second target opening degree of the electronic expansion valve and a second target rotating speed of the external fan.

15 Claims, 3 Drawing Sheets

(56) References Cited

FOREIGN PATENT DOCUMENTS

| | | |
|---|---|---|
| CN | 106487011 A | 3/2017 |
| CN | 108482055 A | 9/2018 |
| CN | 109193721 A | 1/2019 |
| WO | 2018234945 A1 | 12/2018 |

* cited by examiner

CONTROL METHOD FOR AIR CONDITIONER, AND DEVICE FOR AIR CONDITIONER AND STORAGE MEDIUM

CROSS-REFERENCE TO RELATED APPLICATION

This application is a 371 of International Patent Application No. PCT/CN2019/125505, filed Dec. 16, 2019, which claims priority to Chinese patent application No. 201910258756.9 filed on Apr. 1, 2019 and entitled "Control Method and Device for Air Conditioner", the disclosure of which is hereby incorporated by reference in their entireties.

TECHNICAL FIELD

The disclosure relates to the field of air-conditioner control technologies, specifically relates to a control method for an air conditioner, a device for the air conditioner and a storage medium.

BACKGROUND

Optimizing the operation control of an air-conditioning system can not only improve the resource utilization rate, but also improve the real-time control performance of an indoor temperature and comfort of a user's family life. A method known to the inventor is that: the operation of an air conditioner is controlled by adopting a closed-loop automatic control strategy (also named Proportion-Integral-Differential, PID), the PID parameters of the traditional PID control strategy of the air conditioner are determined according to personal experience, the adaptive adjustment capability is lacked during an operating process of the air conditioner, and not satisfy the control requirements of different working conditions. The energy consumption is high, the control accuracy is low, and the user experience is poor. There is still no corresponding method for implementing the energy-saving and high-efficiency control on the air conditioner and improving the generalization ability and user experience in the related art by the inventor.

SUMMARY

According to one aspect of the disclosure, a control method for an air conditioner is provided. The method includes the following operation: a first reward matrix is constructed according to multiple sets of target operating parameters of an air conditioner, wherein each of the multiple sets of the target operating parameters of the air conditioner at least comprises a target indoor environment temperature, a target outdoor environment temperature, a target setting temperature, a target intermediate temperature of an indoor evaporator, a target intermediate temperature of an outdoor condenser, a first target operating frequency of a compressor, a first target opening degree of an electronic expansion valve and a first target rotating speed of an external fan; a maximum expected benefit of performing a current action in a current state is calculated based on the first reward matrix and a Q-learning algorithm, wherein the current state is represented by a current indoor environment temperature and a current outdoor environment temperature, and the current action is represented by a current operating frequency of the compressor, a current opening degree of the electronic expansion valve and a current rotating speed of the external fan; and target action parameters under the maximum expected benefit are acquired, and operation of the air conditioner is controlled based on second target action parameters, wherein the second target action parameters at least comprise a second target operating frequency of the compressor, a second target opening degree of the electronic expansion valve and a second target rotating speed of the external fan.

In some embodiments, before constructing the first reward matrix according to the multiple sets of the target operating parameters of the air conditioner, the method further includes the following operation: air conditioner operating parameters at multiple moments in an actual working condition are collected, wherein the air conditioner operating parameters collected under each of the multiple moments comprise at least one of an indoor environment temperature, an outdoor environment temperature, a setting temperature, an intermediate temperature of the indoor evaporator, an intermediate temperature of the outdoor condenser, an operating frequency of the compressor, an opening degree of the electronic expansion valve and a rotating speed of the external fan; and default parameter filling on the air conditioner operating parameters collected under each of the multiple moments is performed based on a constraint network model, so as to obtain the multiple sets of the target operating parameters of the air conditioner, wherein input of the constraint network model at least comprises the indoor environment temperature, the outdoor environment temperature, the setting temperature, the intermediate temperature of the indoor evaporator and the intermediate temperature of the outdoor condenser, and output of the constraint network model comprises at least the operating frequency of the compressor, the opening degree of the electronic expansion valve and the rotating speed of the external fan.

In some embodiments, before performing the default parameter filling on the air conditioner operating parameters collected under each of the multiple moments based on the constraint network model, so as to obtain the multiple sets of operating parameters of the target air conditioner, the method further includes the following operation: a second reward matrix is constructed based on multiple sets of standard operating parameters of the air conditioner, wherein the multiple sets of standard operating parameters of the air conditioner are air conditioner operating parameters satisfying a preset condition; training set data and validation set data are acquired from the second reward matrix; a radial basis function neural network model is trained based on the training set data, wherein the radial basis function neural network model comprises an input layer, a hidden layer and an output layer, and the number of neuron in the hidden layer of the radial basis function neural network model is regulated by an objective loss function; an accuracy rate of the radial basis function neural network model is verified based on the validation set data; and the radial basis function neural network model is used as the constraint network model in a case that the accuracy rate of the radial basis function neural network model is greater than a preset value.

In some embodiments, before constructing the second reward matrix based on the multiple sets of the standard operating parameters of the air conditioner, the method further includes the following operation: multiple sets of experimental operating parameters of the air conditioner are collected, wherein each of the multiple sets of the experimental operating parameters of the air conditioner at least comprises an experimental indoor environment temperature, an experimental outdoor environment temperature, an experimental setting temperature, an experimental intermediate temperature of the indoor evaporator, an experimental intermediate temperature of the outdoor condenser, an experimental operating frequency of the compressor, an experimental opening degree of the electronic expansion valve and an experimental rotating speed of the external fan; a reward value of each of the multiple sets of the experimental operating parameters of the air conditioner is calculated according to the following formula: Reward=f($\Delta T_{indoor}$, $\Delta T_{outdoor}$), wherein Reward represents the reward value, f($\square$) represents a reward function, $\Delta T_{indoor}$ represents a difference value between the experimental indoor temperature and the experimental setting temperature, $\Delta T_{outdoor}$ represents the difference value between the experimental outdoor temperature and the outdoor temperature under a target working condition; and the set of experimental operating parameters of the air conditioner whose reward value is in a preset scope of the reward value is used as one set of standard operating parameters of the air conditioner.

In some embodiments, calculating the maximum expected benefit of performing the current action in the current state based on the first reward matrix and the Q-learning algorithm includes that the maximum expected benefit is calculated according to the following formula: $Q(s, a) = R(s, a) + \Theta \bullet \max\{Q(s_{next}, a_{next})\}$, wherein s represents the current state, a represents the current action, $s_{next}$ represents a next state, $a_{next}$ represents a next action, R(s, a) represents the first reward matrix, $Q(s_{next}, a_{next})$ represents a maximum expected benefit obtained through performing the action $a_{next}$ under the state $s_{next}$, Q(s, a) represents the maximum expected benefit obtained through performing the action a under the state s, and $\Theta$ represents a greedy factor.

In some embodiments, obtaining the target action parameter under the maximum expected benefit includes that the target action parameter is calculated according to the following formula: $Q(s, a) = \max\{Q(s, a_{next})\}$, wherein s represents the current state, $a_{next}$ represents the next action, $Q(s, a_{next})$ represents the maximum expected benefit obtained through performing the action $a_{next}$ under the state s, Q(s, a) represents the maximum expected benefit obtained through performing the action a under the state s; and an operating frequency of the compressor, an opening degree of the electronic expansion valve and a rotating speed of the external fan corresponding to $a_{next}$ under Q(s, a) are taken as the target action parameters.

In some embodiments, after controlling the operation of the air conditioner based on the target action parameters, the method further includes the following operation: parameters of the first reward matrix are modified based on feedback data, wherein the feedback data is configured to feed back the operation of the air conditioner; and the constraint network model is updated based on the modified first reward matrix whose parameters are modified.

According to another aspect of the disclosure, a control device for an air conditioner is provided. The device includes a first constructing unit, a first calculating unit and a first obtaining unit. Herein, the first constructing unit is configured to construct the first reward matrix according to the multiple sets of the target operating parameters of the air conditioner, wherein each of the multiple sets of the target operating parameters of the air conditioner at least comprises the target indoor environment temperature, the target outdoor environment temperature, the target setting temperature, the target intermediate temperature of the indoor evaporator, the target intermediate temperature of the outdoor condenser, the first target operating frequency of the compressor, the first target opening degree of the electronic expansion valve and the first target rotating speed of the external fan; the first calculating unit is configured to calculate the maximum expected benefit of performing the current action in the current state based on the first reward matrix and the Q-learning algorithm, wherein the current state is represented by the current indoor environment temperature and the current outdoor environment temperature, and the current action is represented by the current operating frequency of the compressor, the current opening degree of the electronic expansion valve and the current rotating speed of the external fan; and the first obtaining unit is configured to acquire the target action parameters under the maximum expected benefit, and controlling operation of the air conditioner based on the second target action parameters, wherein the second target action parameters at least comprise the second target operating frequency of the compressor, the second target opening degree of the electronic expansion valve and the second target rotating speed of the external fan.

In order to implement the above purpose, according to another aspect of the disclosure, a storage medium is provided, comprising a stored program, wherein the program executes the control methods for the air conditioner as described in any of the described methods.

In order to implement the above purpose, according to another aspect of the disclosure, a processor is provided, configured to run a program, wherein when running, the program executes the control methods for the air conditioner as described in any of the described methods.

BRIEF DESCRIPTION OF THE DRAWINGS

The drawings, which constitute a part of the disclosure, are used to provide a further understanding of the disclosure, and the exemplary embodiments of the disclosure and the description thereof are used to explain the disclosure, but do not constitute improper limitations to the disclosure. In the drawings.

DETAILED DESCRIPTION OF THE EMBODIMENTS

It should be noted that embodiments in the disclosure and features in the embodiments may be combined with each other without conflict. The disclosure will be described below in detail with reference to drawings and in combination with the embodiments.

In order to make those skilled in the related art understand the solutions of the disclosure better, the technical solutions in the embodiments of the disclosure are clearly and completely elaborated below in combination with the drawings. It is apparent that the described embodiments are only a part of the embodiments of the disclosure but not all. Based on the embodiments of the disclosure, all the other embodiments obtained by those of ordinary skill in the art on the premise of not contributing creative effort should belong to the protection scope of the disclosure.

It should be noted that terms "first", "second" and the like in the description, claims and the abovementioned drawings of the disclosure are adopted not to describe a specific sequence but to distinguish similar objects. It should be understood that the terms used in such a way may be exchanged where appropriate, in order that the embodiments of the disclosure described here can be described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

According to the embodiments of the disclosure, a control method for an air conditioner is provided.

Figure 1:
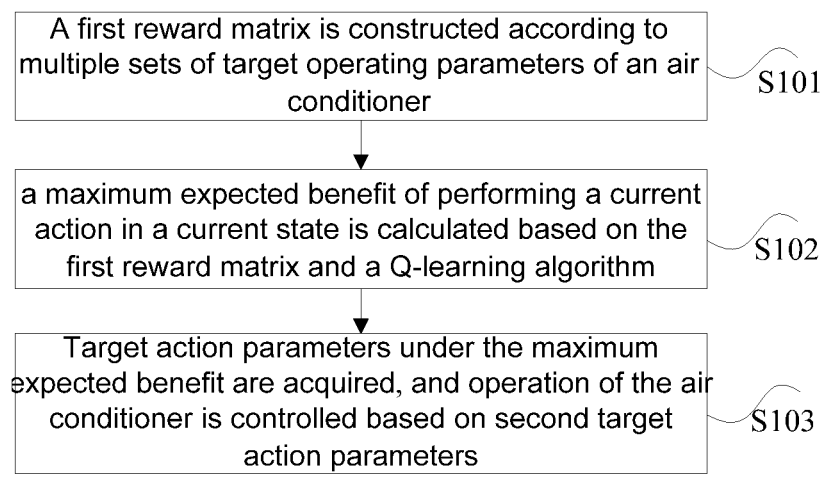
FIG. 1 is a flow chart of a control method for an air conditioner according to some embodiments, of the disclosure.

FIG. 1 is a flow chart of a control method for an air conditioner according to some embodiments, of the disclosure. As shown in FIG. 1, the method includes the following steps:

In step S101, a first reward matrix is constructed according to multiple sets of target operating parameters of an air conditioner, wherein each of the multiple sets of the target operating parameters of the air conditioner at least comprises a target indoor environment temperature, a target outdoor environment temperature, a target setting temperature, a target intermediate temperature of an indoor evaporator, a target intermediate temperature of an outdoor condenser, a first target operating frequency of a compressor, a first target opening degree of an electronic expansion valve and a first target rotating speed of an external fan.

It should be noted that the first reward matrix is data basis for optimizing control operation of the air conditioner. Specifically, the first reward matrix is constructed through taking set as a row of the matrix and taking the target operating parameters of the air conditioner of each set as a column.

Optionally, in the control method for the air conditioner provided by the embodiments of the disclosure, before constructing the first reward matrix according to the multiple sets of the target operating parameters of the air conditioner, the method further includes the following operation: air conditioner operating parameters at multiple moments in an actual working condition are collected, wherein the air conditioner operating parameters collected under each of the multiple moments comprise at least one of an indoor environment temperature, an outdoor environment temperature, a setting temperature, an intermediate temperature of the indoor evaporator, an intermediate temperature of the outdoor condenser, an operating frequency of the compressor, an opening degree of the electronic expansion valve and a rotating speed of the external fan; and default parameter filling on the air conditioner operating parameters collected under each of the multiple moments is performed based on a constraint network model, so as to obtain the multiple sets of the target operating parameters of the air conditioner, wherein input of the constraint network model at least comprises the indoor environment temperature, the outdoor environment temperature, the setting temperature, the intermediate temperature of the indoor evaporator and the intermediate temperature of the outdoor condenser, and output of the constraint network model comprises at least the operating frequency of the compressor, the opening degree of the electronic expansion valve and the rotating speed of the external fan.

It should be noted that a trained constraint network model CE(f, v, d) is adopted to predicate the default parameter when collecting data in the actual working condition due to a case that each of the multiple sets of the target operating parameters of the air conditioner constructing the first reward matrix is not completely detected, and then a set of complete data is obtained. For example, an indoor environment temperature, an outdoor environment temperature, a setting temperature, an intermediate temperature of the indoor evaporator and an intermediate temperature of the outdoor condenser are detected at a target moment. Due to the limitation of a detection environment, an operating frequency of the compressor, an opening degree of the electronic expansion valve and an rotating speed of the external fan under the target moment are not detected, so the indoor environment temperature, the outdoor environment temperature, the setting temperature, the intermediate temperature of the indoor evaporator and the intermediate temperature of the outdoor condenser are input into the constraint network model CE (f, v, d), those parameters are trained through the constraint network model CE (f, v, d), the operating frequency of the compressor, the opening degree of the electronic expansion valve and the rotating speed of the external fan are output, thereby implementing filling undetected default parameter under the target moment.

Optionally, in the control method for the air conditioner provided by the embodiments of the disclosure, before performing the default parameter filling on the air conditioner operating parameters collected under each of the multiple moments based on the constraint network model, so as to obtain the multiple sets of operating parameters of the target air conditioner, the method further includes the following operation: a second reward matrix is constructed based on multiple sets of standard operating parameters of the air conditioner, wherein the multiple sets of standard operating parameters of the air conditioner are air conditioner operating parameters satisfying a preset condition; training set data and validation set data are acquired from the second reward matrix; a radial basis function neural network model is trained based on the training set data, wherein the radial basis function neural network model comprises an input layer, a hidden layer and an output layer, and the number of neuron in the hidden layer of the radial basis function neural network model is regulated by an objective loss function; an accuracy rate of the radial basis function neural network model is verified based on the validation set data; and the radial basis function neural network model is used as the constraint network model in a case that the accuracy rate of the radial basis function neural network model is greater than a preset value.

It should be noted that a suitable constraint network model needs to be constructed in order to ensure an accuracy of data prediction because default parameter not detected under the actual working condition is filled through the constraint network model. Specifically, under a test condition, the second reward matrix is constructed based on the multiple sets of the standard operating parameters of the air conditioner. Firstly, air conditioner operation data corresponding to an element in the second reward matrix is subjected to the division of the training set and the validation set, and then the radial basis function neural network model is initialized. The radial basis function neural network model is trained based on training set data, a root-mean-square deviation is used as a loss function during a training process, namely, when the loss function reaches to a target value, a model training is end, thereby ensuring the training effectiveness. After the model training, a trained model is verified based on the validation set. Specifically, a part of data in one set of the training set data is input in the model, so that remaining data is predicted. Predicted data is compared with real data to verify an accuracy of the model. Specifically, if the preset value is 90% and a model accuracy rate is above 90%, the model is defined as a standard, comfortable and energy-saving constraint network model. If the model accuracy rate is not enough, the data is collected again for the network training until the model accuracy rate reaches to 90%.

Optionally, in the control method for the air conditioner provided by the embodiments of the disclosure, before constructing the second reward matrix based on the multiple sets of the standard operating parameters of the air conditioner, the method further includes the following operation: multiple sets of experimental operating parameters of the air conditioner are collected, wherein each of the multiple sets of the experimental operating parameters of the air conditioner at least comprises an experimental indoor environment temperature, an experimental outdoor environment temperature, an experimental setting temperature, an experimental intermediate temperature of the indoor evaporator, an experimental intermediate temperature of the outdoor condenser, an experimental operating frequency of the compressor, an experimental opening degree of the electronic expansion valve and an experimental rotating speed of the external fan; a reward value of each of the multiple sets of the experimental operating parameters of the air conditioner according to the following formula:

Reward=$f(\Delta T_{indoor}, \Delta T_{outdoor})$, wherein Reward represents the reward value, f ( ǁ ) represents a reward function, $\Delta T_{indoor}$ represents a difference value between the experimental indoor temperature and the experimental setting temperature, $\Delta T_{outdoor}$ represents the difference value between the experimental outdoor temperature and the outdoor temperature under a target working condition; and the set of experimental operating parameters of the air conditioner whose reward value is in a preset scope of the reward value is used as one set of standard operating parameters of the air conditioner.

Specifically, the multiple sets of the experimental operating parameters of the air conditioner under an experimental condition are collected, the reward value of each of the multiple sets of the experimental operating parameters of the air conditioner is calculated, and air conditioners with different types have different scopes of preset reward value. If the preset reward value is 1 and the calculated reward value is 0, a preset condition is not satisfied and this set of experimental operating data of the air conditioner is eliminated. If the calculated reward value is 1, the preset condition is satisfied and this set of the experimental operating data is used as one set of the standard operating parameters of the air conditioner. A working condition of this set of the standard operating parameters is judged. Specifically, the data division under different working conditions is performed according to the indoor environment temperature and the outdoor environment temperature, as shown in Table 1:

| Indoor environment (T1) | Outdoor environment (T2) | | | | |
|---|---|---|---|---|---|
| | 41 < T2 ≤ 44 | 38 < T2 ≤ 41 | 35 < T2 ≤ 38 | 32 < T2 ≤ 35 | 29 < T2 ≤ 32 |
| T1 < 16 | Standard operating parameter of the air conditioner | Standard operating parameter of the air conditioner | Standard operating parameter of the air conditioner | Standard operating parameter of the air conditioner | Standard operating parameter of the air conditioner |
| 16 ≤ T1 < 19 | Standard operating parameter of the air conditioner | Standard operating parameter of the air conditioner | Standard operating parameter of the air conditioner | Standard operating parameter of the air conditioner | Standard operating parameter of the air conditioner |
| 19 ≤ T1 < 22 | Standard operating parameter of the air conditioner | Standard operating parameter of the air conditioner | Standard operating parameter of the air conditioner | Standard operating parameter of the air conditioner | Standard operating parameter of the air conditioner |
| 22 ≤ T1 < 25 | Standard operating parameter of the air conditioner | Standard operating parameter of the air conditioner | Standard operating parameter of the air conditioner | Standard operating parameter of the air conditioner | Standard operating parameter of the air conditioner |
| 25 ≤ T1 < 28 | Standard operating parameter of the air conditioner | Standard operating parameter of the air conditioner | Standard operating parameter of the air conditioner | Standard operating parameter of the air conditioner | Standard operating parameter of the air conditioner |

For example, a working condition that the indoor environment temperature T1 satisfies T1<16 and the outdoor environment temperature T2 satisfies 41<T2÷44 is determined as a first working condition. If the indoor environment temperature in this set of the standard operating parameters of the air conditioner satisfies T1<16 and the outdoor environment temperature satisfies 41<T2≤44, this set of the standard operating parameters of the air conditioner is filled in a corresponding blank of the first working condition, namely, data that satisfies a Reward function and is capable of operating for a certain time stably is put into the second reward matrix, so the combination of the Monte Carlo thought with the Reward function based on specialist experience is implemented, and then the second reward matrix is constructed under each working condition.

In step S102, a maximum expected benefit of performing a current action in a current state is calculated based on the first reward matrix and a Q-learning algorithm, wherein the current state is represented by a current indoor environment temperature and a current outdoor environment temperature, and the current action is represented by a current operating frequency of the compressor, a current opening degree of the electronic expansion valve and a current rotating speed of the external fan.

Optionally, in the control method for the air conditioner provided by the embodiments of the disclosure, the operation that the maximum expected benefit of performing the current action in the current state is calculated based on the first reward matrix and the Q-learning algorithm includes that the maximum expected benefit is calculated according to the following formula.

$Q(s, a) = R(s, a) + \Theta \bullet \max\{Q(s_{next}, a_{next})\}$, wherein s represents the current state, a represents the current action, $s_{next}$ represents a next state, $a_{next}$ represents a next action, R(s, a) represents the first reward matrix, $Q(s_{next}, a_{next})$ represents a maximum expected benefit obtained through performing the action $a_{next}$ under the state $s_{next}$, Qs, a) represents the maximum expected benefit obtained through performing the action a under the state s, and Θ represents a greedy factor.

It should be noted that the above is a process for learning a Q table through using the obtained first reward matrix (RCE) and the above formula, wherein Q has the same order with R, s represents the current state and is at least represented by the current indoor environment temperature and the current outdoor environment temperature, a represents the current action and is represented by the operating frequency of the compressor, the opening degree of the electronic expansion valve and the current rotating speed of the external fan, $s_{next}$ represents a possible state, $a_{next}$ represents a next possible action, and $\Theta$ represents the greedy factor which is usually set as 0.8. In step S103, target action parameters under the maximum expected benefit are acquired, and operation of the air conditioner is controlled based on second target action parameters, wherein the second target action parameters at least comprise a second target operating frequency of the compressor, a second target opening degree of the electronic expansion valve and a second target rotating speed of the external fan.

Optionally, in the control method for the air conditioner provided by the embodiments of the disclosure, the operation of obtaining the target action parameter under the maximum expected benefit includes that the target action parameter is calculated according to the following formula.

$Q(s, a) = \max\{Q(s, a_{next})\}$, wherein s represents the current state, $a_{next}$ represents the next action, $Q(s, a_{next})$ represents the maximum expected benefit obtained through performing the action $a_{next}$ under the state s, $Q(s, a)$ represents the maximum expected benefit obtained through performing the action a under the state s; and an operating frequency of the compressor, an opening degree of the electronic expansion valve and a rotating speed of the external fan corresponding to $a_{next}$ under $Q(s, a)$ are taken as the target action parameters.

It should be noted that a possible action under the maximum expected benefit is determined, the operating frequency of the compressor, the opening degree of the electronic expansion valve and the rotating speed of the external fan under this action are obtained, and operation of the air conditioner is optimized based on the obtained parameters, namely, the effect of improving adaptive adjustment capability of the closed-loop automatic control of the air conditioner is implemented.

Optionally, in the control method for the air conditioner provided by the embodiments of the disclosure, after controlling the operation of the air conditioner based on the target action parameters, the method further includes the following operation: parameters of the first reward matrix are modified based on feedback data, wherein the feedback data is configured to feed back the operation of the air conditioner; and the constraint network model is updated based on the modified first reward matrix whose parameters are modified.

It should be noted that advantages and disadvantages of an air-conditioning operation control strategy in the last step are verified through actual user feedback. Specifically, the second reward matrix is modified based on user feedback data, and the constraint network model CE (f, v, d) is updated through data sets corresponding to the modified second reward matrix, so that the constraint network model fits with current operation environment well and satisfies user demands.

According to the control method for the air conditioner provided by the embodiments of the disclosure, the first reward matrix is constructed according to the multiple sets of the target operating parameters of the air conditioner, wherein each of the multiple sets of the target operating parameters of the air conditioner at least comprises the target indoor environment temperature, the target outdoor environment temperature, the target setting temperature, the target intermediate temperature of the indoor evaporator, the target intermediate temperature of the outdoor condenser, the first target operating frequency of the compressor, the first target opening degree of the electronic expansion valve and the first target rotating speed of the external fan; the maximum expected benefit of performing the current action in the current state is calculated based on the first reward matrix and the Q-learning algorithm, wherein the current state is represented by the current indoor environment temperature and the current outdoor environment temperature, and the current action is represented by the current operating frequency of the compressor, the current opening degree of the electronic expansion valve and the current rotating speed of the external fan; and the target action parameters under the maximum expected benefit are acquired, and the operation of the air conditioner is controlled based on the second target action parameters, wherein the second target action parameters at least comprise the second target operating frequency of the compressor, the second target opening degree of the electronic expansion valve and the second target rotating speed of the external fan. And the problem of poor adaptive adjustment capability for the air-conditioning control in the related art due to the fact that the closed-loop automatic control parameters of the air conditioner needs to be manually set is solved. Through constructing the first reward matrix according to the target operating parameters of the air conditioner, obtaining the maximum expected benefit by learning the first reward matrix, and controlling the operation of the air conditioner according to the target action parameters under the maximum expected benefit, the effect of improving the adaptive adjustment capability of the closed-loop automatic control of the air conditioner is achieved.

Figure 2:
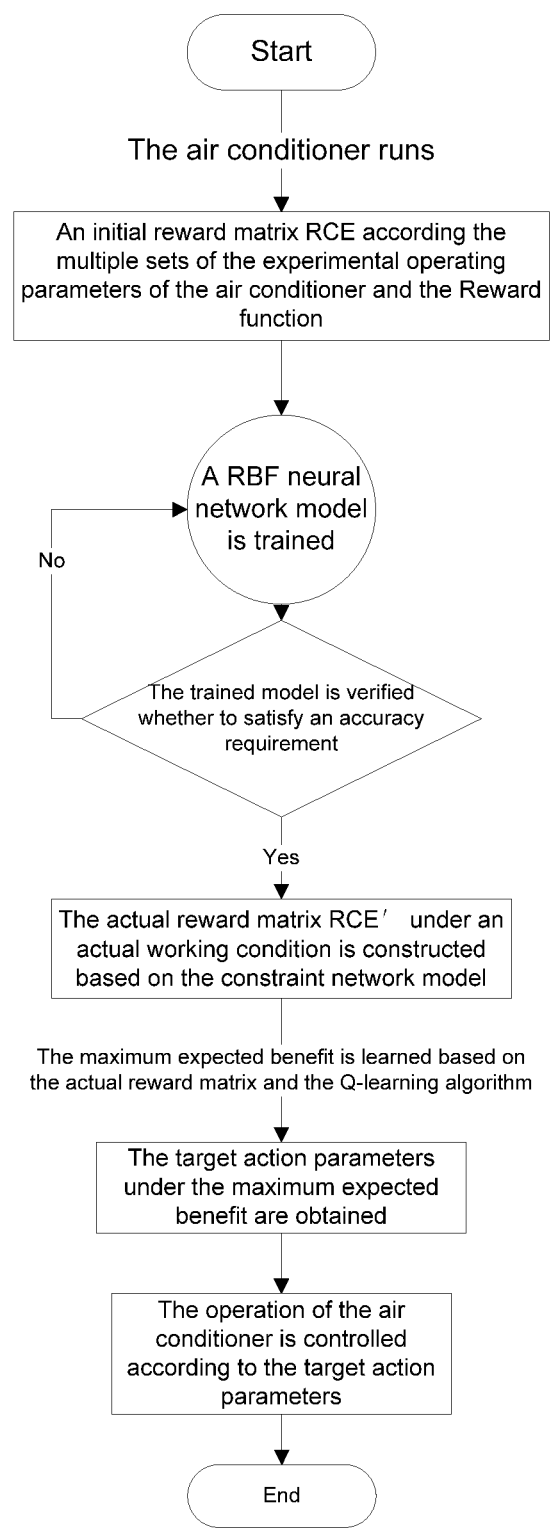
FIG. 2 is a flow chart of another control method for the air conditioner according to some embodiments, of the disclosure.

FIG. 2 is a flow chart of another control method for the air conditioner according to some embodiments, of the disclosure. As shown in FIG. 2, the method includes the following steps:

An initial reward matrix is constructed according the multiple sets of the experimental operating parameters of the air conditioner and the Reward function, wherein parameters in the initial reward matrix are the experimental operating parameters of the air conditioner for satisfying a preset scope value of the Reward function, and a Radial Basis Function (RBF) neural network model is trained based on training set data in the initial reward matrix so as to construct the constraint network model. The trained model is verified whether to satisfy an accuracy requirement based on validation set data in the initial reward matrix, and an actual reward matrix is determined based on the constraint network model when meeting the accuracy requirement. Specifically, undetected default parameters of operating parameters in an actual working condition is predicted according to the constraint network model, the actual reward matrix is constructed according to the actual operating parameters and the predicted operating parameter, the maximum expected benefit of performing the current action in the current state is calculated based on the actual reward matrix and the Q-learning algorithm, and the operation of the air conditioner is controlled based on the target action parameters under the maximum expected benefit.

It should be noted that the steps presented in the flow charts of the drawings can be executed in a computer system like a group of computer executable instructions, and moreover, although a logical sequence is shown in the flow charts, in some cases, the presented or described steps can be performed in a sequence different from that described here.

Embodiments of the disclosure further provide a control device for the air conditioner. It should be noted that the control device for the air conditioner in the embodiments of the disclosure can be configured to execute the control methods for the air conditioner provided by the embodiments of the disclosure. The control device for the air conditioner provided by the embodiments of the disclosure is described below.

Figure 3:
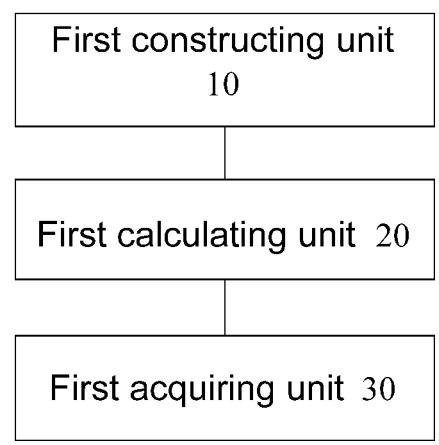
FIG. 3 is a schematic diagram of a control device for the air conditioner according to some embodiments, of the disclosure.

FIG. 3 is a schematic diagram of a control device for the air conditioner according to some embodiments, of the disclosure. As shown in FIG. 3, the device includes a first constructing unit 10, a first calculating unit 20 and a first acquiring unit 30.

Specifically, the first constructing unit 10 is configured to construct the first reward matrix according to the multiple sets of the target operating parameters of the air conditioner, wherein each of the multiple sets of the target operating parameters of the air conditioner at least comprises the target indoor environment temperature, the target outdoor environment temperature, the target setting temperature, the target intermediate temperature of the indoor evaporator, the target intermediate temperature of the outdoor condenser, the first target operating frequency of the compressor, the first target opening degree of the electronic expansion valve and the first target rotating speed of the external fan.

The first calculating unit 20 is configured to calculate the maximum expected benefit of performing the current action in the current state based on the first reward matrix and the Q-learning algorithm, wherein the current state is represented by the current indoor environment temperature and the current outdoor environment temperature, and the current action is represented by the current operating frequency of the compressor, the current opening degree of the electronic expansion valve and the current rotating speed of the external fan.

The first acquiring unit 30 is configured to acquire the target action parameters under the maximum expected benefit, and controlling operation of the air conditioner based on the second target action parameters, wherein the second target action parameters at least comprise the second target operating frequency of the compressor, the second target opening degree of the electronic expansion valve and the second target rotating speed of the external fan.

Optionally, in the control device for the air conditioner provided by the embodiments of the disclosure, the device further includes a first collecting unit and a filling unit. The first collecting unit is configured to collect the air conditioner operating parameters under the multiple moments in the actual working condition before constructing the first reward matrix according to the multiple sets of the target operating parameters of the air conditioner, wherein the air conditioner operating parameters collected under each of the multiple moments comprise at least one of the indoor environment temperature, the outdoor environment temperature, the setting temperature, the intermediate temperature of the indoor evaporator, the intermediate temperature of the outdoor condenser, the operating frequency of the compressor, the opening degree of the electronic expansion valve and the rotating speed of the external fan. The filling unit is configured to perform the default parameter filling on the air conditioner operating parameters collected under each of the multiple moments based on the constraint network model, so as to obtain the multiple sets of the target operating parameters of the air conditioner, wherein the input of the constraint network model at least comprises the indoor environment temperature, the outdoor environment temperature, the setting temperature, the intermediate temperature of the indoor evaporator and the intermediate temperature of the outdoor condenser, and the output of the constraint network model comprises at least the operating frequency of the compressor, the opening degree of the electronic expansion valve and the rotating speed of the external fan.

Optionally, in the control device for the air conditioner provided by the embodiments of the disclosure, the device further includes a second constructing unit, a second acquiring unit, a training unit, a verifying unit and a first determining unit. Before performing the default parameter filling on the air conditioner operating parameters collected under each of the multiple moments based on the constraint network model, so as to obtain the multiple sets of operating parameters of the target air conditioner, the second constructing unit is configured to construct the second reward matrix based on the multiple sets of the standard operating parameters of the air conditioner, wherein the multiple sets of the standard operating parameters of the air conditioner are the air conditioner operating parameters satisfying the preset condition. The second acquiring unit is configured to acquire the training set data and the validation set data from the second reward matrix. The training unit is configured to train the radial basis function neural network model based on the training set data, wherein the radial basis function neural network model comprises the input layer, the hidden layer and the output layer, and the number of neuron in the hidden layer of the radial basis function neural network model is regulated by the objective loss function. The verifying unit is configured to verify the accuracy rate of the radial basis function neural network model based on the validation set data. The first determining unit is configured to use the radial basis function neural network model as the constraint network model in a case that the accuracy rate of the radial basis function neural network model is greater than the preset value.

Optionally, in the control device for the air conditioner provided by the embodiments of the disclosure, the device further includes a second collecting unit and a second calculating unit. The second collecting unit is configured to collect the multiple sets of the experimental operating parameters of the air conditioner before constructing the second reward matrix based on the multiple sets of the standard operating parameters of the air conditioner, wherein each of the multiple sets of the experimental operating parameters of the air conditioner at least comprises the experimental indoor environment temperature, the experimental outdoor environment temperature, the experimental setting temperature, the experimental intermediate temperature of the indoor evaporator, the experimental intermediate temperature of the outdoor condenser, the experimental operating frequency of the compressor, the experimental opening degree of the electronic expansion valve and the experimental rotating speed of the external fan. The second calculating unit is configured to calculate the reward value of each of the multiple sets of the experimental operating parameters of the air conditioner is calculated according to the following formula: Reward=$f(\Delta T_{indoor}, \Delta T_{outdoor})$, wherein Reward represents the reward value, $f(\cdot)$ represents a reward function, $\Delta_{indoor}$ represents a difference value between the experimental indoor temperature and the experimental setting temperature, $\Delta T_{outdoor}$ represents the difference value between the experimental outdoor temperature and the outdoor temperature under a target working condition; and the set of experimental operating parameters of the air conditioner whose reward value is in a preset scope of the reward value is used as one set of standard operating parameters of the air conditioner.

Optionally, in the control device for the air conditioner provided by the embodiments of the disclosure, the first calculating unit 20 includes a first calculating module, configured to calculate the maximum expected benefit according to the following formula: $Q(s, a) = R(s, a) + \Theta \bullet \max\{Q(s_{next}, a_{next})\}$, wherein s represents the current state, a represents the current action, $s_{next}$ represents a next state, $a_{next}$ represents a next action, R(s, a) represents the first reward matrix, $Q(s_{next}, a_{next})$ represents a maximum expected benefit obtained through performing the action $a_{next}$ under the state $s_{next}$, Q(s, a) represents the maximum expected benefit obtained through performing the action a under the state s, and $\Theta$ represents a greedy factor.

Optionally, in the control device for the air conditioner provided by the embodiments of the disclosure, the first acquiring unit 30 includes a second calculating module, configured to calculate the target action parameter according to the following formula: $Q(s, a) = \max\{Q(s, a_{next})\}$, wherein s represents the current state, $a_{next}$ represents the next action, $Q(s, a_{next})$ represents the maximum expected benefit obtained through performing the action $a_{next}$ under the state s, Q(s, a) represents the maximum expected benefit obtained through performing the action a under the state s; and an operating frequency of the compressor, an opening degree of the electronic expansion valve and a rotating speed of the external fan corresponding to $a_{next}$ under Q(s, a) are taken as the target action parameters.

Optionally, in the control device for the air conditioner provided by the embodiments of the disclosure, the device further includes a modifying unit and an updating unit. The modifying unit is configured to modify the parameters of the first reward matrix based on feedback data after controlling the operation of the air conditioner based on the target action parameters, wherein the feedback data is configured to feed back the operation of the air conditioner, and the updating unit is configured to update the constraint network model based on the modified first reward matrix, wherein the feedback data is configured to feed back the operation of the air conditioner.

According to the control device for the air conditioner provided by the embodiments of the disclosure, the device includes a first constructing unit 10, a first calculating unit 20 and a first acquiring unit 30. The first constructing unit 10 is configured to construct the first reward matrix according to the multiple sets of the target operating parameters of the air conditioner, wherein each of the multiple sets of the target operating parameters of the air conditioner at least comprises the target indoor environment temperature, the target outdoor environment temperature, the target setting temperature, the target intermediate temperature of the indoor evaporator, the target intermediate temperature of the outdoor condenser, the first target operating frequency of the compressor, the first target opening degree of the electronic expansion valve and the first target rotating speed of the external fan; the first calculating unit 20 is configured to calculate the maximum expected benefit of performing the current action in the current state based on the first reward matrix and the Q-learning algorithm, wherein the current state is represented by the current indoor environment temperature and the current outdoor environment temperature, and the current action is represented by the current operating frequency of the compressor, the current opening degree of the electronic expansion valve and the current rotating speed of the external fan; the first acquiring unit 30 is configured to acquire the target action parameters under the maximum expected benefit, and controlling operation of the air conditioner based on the second target action parameters, wherein the second target action parameters at least comprise the second target operating frequency of the compressor, the second target opening degree of the electronic expansion valve and the second target rotating speed of the external fan. Through these units, the problem of poor adaptive adjustment capability for the air-conditioning control in the related art due to the fact that the closed-loop automatic control parameters of the air conditioner needs to be manually set is solved. Through constructing the first reward matrix according to the target operating parameters of the air conditioner, obtaining the maximum expected benefit by learning the first reward matrix, and controlling the operation of the air conditioner according to the target action parameters under the maximum expected benefit, the effect of improving the adaptive adjustment capability of the closed-loop automatic control of the air conditioner is achieved.

The control device of the air conditioner includes a processor and a memory. The first constructing unit 10, the first calculating unit 20, the first acquiring unit 30 and the like are stored in the memory as program units, and the above program units stored in the memory are executed by the processor so as to implement the corresponding functions.

The processor includes a kernel, which can call a corresponding program unit in the memory. One or more kernels can be set, and the problem of poor adaptive adjustment capability for the air-conditioning control in the related art due to the fact that the closed-loop automatic control parameters of the air conditioner needs to be manually set is solved through adjusting kernel parameters.

The memory can include forms of a volatile memory in a computer-readable medium, a Random Access Memory (RAM) and/or a volatile memory and the like, such as a read-only memory (ROM) or a flash (flash RAM), and the memory includes at least one storage chip.

The embodiments of the disclosure provide a storage medium, comprising a stored program, wherein the program executes the control methods for the air conditioner.

The embodiments of the disclosure provide a processor, configured to run a program, wherein when running, the program executes the control methods for the air conditioner The embodiments of the disclosure provide a device, which includes a processor, a memory and a program stored on the memory and being capable of running on the processor. When the processor executes the program, the following steps are implemented: the first reward matrix is constructed according to the multiple sets of the target operating parameters of the air conditioner, wherein each of the multiple sets of the target operating parameters of the air conditioner at least comprises the target indoor environment temperature, the target outdoor environment temperature, the target setting temperature, the target intermediate temperature of the indoor evaporator, the target intermediate temperature of the outdoor condenser, the first target operating frequency of the compressor, the first target opening degree of the electronic expansion valve and the first target rotating speed of the external fan; the maximum expected benefit of performing the current action in the current state is calculated based on the first reward matrix and the Q-learning algorithm, wherein the current state is represented by the current indoor environment temperature and the current outdoor environment temperature, and the current action is represented by the current operating frequency of the compressor, the current opening degree of the electronic expansion valve and the current rotating speed of the external fan; and the target action parameters under the maximum expected benefit are acquired, and the operation of the air conditioner is controlled based on the second target action parameters, wherein the second target action parameters at least comprise the second target operating frequency of the compressor, the second target opening degree of the electronic expansion valve and the second target rotating speed of the external fan.

Before constructing the first reward matrix according to the multiple sets of the target operating parameters of the air conditioner, the method further includes the following operation: the air conditioner operating parameters at multiple moments in the actual working condition are collected, wherein the air conditioner operating parameters collected under each of the multiple moments comprise at least one of the indoor environment temperature, the outdoor environment temperature, the setting temperature, the intermediate temperature of the indoor evaporator, the intermediate temperature of the outdoor condenser, the operating frequency of the compressor, the opening degree of the electronic expansion valve and the rotating speed of the external fan; and default parameter filling on the air conditioner operating parameters collected under each of the multiple moments is performed based on the constraint network model, so as to obtain the multiple sets of the target operating parameters of the air conditioner, wherein input of the constraint network model at least comprises the indoor environment temperature, the outdoor environment temperature, the setting temperature, the intermediate temperature of the indoor evaporator and the intermediate temperature of the outdoor condenser, and output of the constraint network model comprises at least the operating frequency of the compressor, the opening degree of the electronic expansion valve and the rotating speed of the external fan.

Before performing the default parameter filling on the air conditioner operating parameters collected under each of the multiple moments based on the constraint network model, so as to obtain the multiple sets of operating parameters of the target air conditioner, the method further includes the following operation: the second reward matrix is constructed based on the multiple sets of the standard operating parameters of the air conditioner, wherein the multiple sets of the standard operating parameters of the air conditioner are the air conditioner operating parameters satisfying the preset condition; the training set data and the validation set data are acquired from the second reward matrix; the radial basis function neural network model is trained based on the training set data, wherein the radial basis function neural network model comprises the input layer, the hidden layer and the output layer, and the number of neuron in the hidden layer of the radial basis function neural network model is regulated by the objective loss function; the accuracy rate of the radial basis function neural network model is verified based on the validation set data; and the radial basis function neural network model is used as the constraint network model in the case that the accuracy rate of the radial basis function neural network model is greater than the preset value.

Before constructing the second reward matrix based on the multiple sets of the standard operating parameters of the air conditioner, the method further includes the following operation: the multiple sets of the experimental operating parameters of the air conditioner are collected, wherein each of the multiple sets of the experimental operating parameters of the air conditioner at least comprises the experimental indoor environment temperature, the experimental outdoor environment temperature, the experimental setting temperature, the experimental intermediate temperature of the indoor evaporator, the experimental intermediate temperature of the outdoor condenser, the experimental operating frequency of the compressor, the experimental opening degree of the electronic expansion valve and the experimental rotating speed of the external fan; the reward value of each of the multiple sets of the experimental operating parameters of the air conditioner is calculated according to the following formula:

Reward=$f(\Delta T_{indoor}, \Delta T_{outdoor})$, wherein Reward represents the reward value, $f(\sqcup)$ represents a reward function, $\Delta_{indoor}$ represents a difference value between the experimental indoor temperature and the experimental setting temperature, $\Delta T_{outdoor}$ represents the difference value between the experimental outdoor temperature and the outdoor temperature under a target working condition; and the set of experimental operating parameters of the air conditioner whose reward value is in a preset scope of the reward value is used as one set of standard operating parameters of the air conditioner.

The operation of calculating the maximum expected benefit of performing the current action in the current state based on the first reward matrix and the Q-learning algorithm includes that the maximum expected benefit is calculated according to the following formula: $Q(s, a) = R(s, a) + \Theta \bullet \max\{Q(s_{next}, a_{next})\}$, wherein s represents the current state, a represents the current action, $s_{next}$ represents a next state, $a_{next}$ represents a next action, $R(s, a)$ represents the first reward matrix, $Q(s_{next}, a_{next})$ represents a maximum expected benefit obtained through performing the action $a_{next}$ under the state $s_{next}$, $Q(s, a)$ represents the maximum expected benefit obtained through performing the action a under the state s, and $\Theta$ represents a greedy factor.

The operation of obtaining the target action parameter under the maximum expected benefit includes that the target action parameter is calculated according to the following formula: $Q(s, a) = \max\{Q(s, a_{next})\}$, wherein s represents the current state, $a_{next}$ represents the next action, $Q(s, a_{next})$ represents the maximum expected benefit obtained through performing the action $a_{next}$ under the state s, $Q(s, a)$ represents the maximum expected benefit obtained through performing the action a under the state s; and an operating frequency of the compressor, an opening degree of the electronic expansion valve and a rotating speed of the external fan corresponding to $a_{next}$ under $Q(s, a)$ are taken as the target action parameters.

After controlling the operation of the air conditioner based on the target action parameters, the method further includes the following operation: the parameters of the first reward matrix are modified based on the feedback data, wherein the feedback data is configured to feed back the operation of the air conditioner; and the constraint network model is updated based on the modified first reward matrix whose parameters are modified. The device herein can be a server, a Personal Computer (PC), a pad (PAD), a mobile phone, etc.

The disclosure further provides a computer program product, which is suitable for executing the initialized program in following method steps when executed on a data processing device: the first reward matrix is constructed according to the multiple sets of the target operating parameters of the air conditioner, wherein each of the multiple sets of the target operating parameters of the air conditioner at least comprises the target indoor environment temperature, the target outdoor environment temperature, the target setting temperature, the target intermediate temperature of the indoor evaporator, the target intermediate temperature of the outdoor condenser, the first target operating frequency of the compressor, the first target opening degree of the electronic expansion valve and the first target rotating speed of the external fan; the maximum expected benefit of performing the current action in the current state is calculated based on the first reward matrix and the Q-learning algorithm, wherein the current state is represented by the current indoor environment temperature and the current outdoor environment temperature, and the current action is represented by the current operating frequency of the compressor, the current opening degree of the electronic expansion valve and the current rotating speed of the external fan; and the target action parameters under the maximum expected benefit are acquired, and the operation of the air conditioner is controlled based on the second target action parameters, wherein the second target action parameters at least comprise the second target operating frequency of the compressor, the second target opening degree of the electronic expansion valve and the second target rotating speed of the external fan.

Before constructing the first reward matrix according to the multiple sets of the target operating parameters of the air conditioner, the method further includes the following operation: the air conditioner operating parameters at multiple moments in the actual working condition are collected, wherein the air conditioner operating parameters collected under each of the multiple moments comprise at least one of the indoor environment temperature, the outdoor environment temperature, the setting temperature, the intermediate temperature of the indoor evaporator, the intermediate temperature of the outdoor condenser, the operating frequency of the compressor, the opening degree of the electronic expansion valve and the rotating speed of the external fan; and default parameter filling on the air conditioner operating parameters collected under each of the multiple moments is performed based on the constraint network model, so as to obtain the multiple sets of the target operating parameters of the air conditioner, wherein input of the constraint network model at least comprises the indoor environment temperature, the outdoor environment temperature, the setting temperature, the intermediate temperature of the indoor evaporator and the intermediate temperature of the outdoor condenser, and output of the constraint network model comprises at least the operating frequency of the compressor, the opening degree of the electronic expansion valve and the rotating speed of the external fan.

Before performing the default parameter filling on the air conditioner operating parameters collected under each of the multiple moments based on the constraint network model, so as to obtain the multiple sets of operating parameters of the target air conditioner, the method further includes the following operation: the second reward matrix is constructed based on the multiple sets of the standard operating parameters of the air conditioner, wherein the multiple sets of the standard operating parameters of the air conditioner are the air conditioner operating parameters satisfying the preset condition; the training set data and the validation set data are acquired from the second reward matrix; the radial basis function neural network model is trained based on the training set data, wherein the radial basis function neural network model comprises the input layer, the hidden layer and the output layer, and the number of neuron in the hidden layer of the radial basis function neural network model is regulated by the objective loss function; the accuracy rate of the radial basis function neural network model is verified based on the validation set data; and the radial basis function neural network model is used as the constraint network model in the case that the accuracy rate of the radial basis function neural network model is greater than the preset value.

Before constructing the second reward matrix based on the multiple sets of the standard operating parameters of the air conditioner, the method further includes the following operation: the multiple sets of the experimental operating parameters of the air conditioner are collected, wherein each of the multiple sets of the experimental operating parameters of the air conditioner at least comprises the experimental indoor environment temperature, the experimental outdoor environment temperature, the experimental setting temperature, the experimental intermediate temperature of the indoor evaporator, the experimental intermediate temperature of the outdoor condenser, the experimental operating frequency of the compressor, the experimental opening degree of the electronic expansion valve and the experimental rotating speed of the external fan; the reward value of each of the multiple sets of the experimental operating parameters of the air conditioner is calculated according to the following formula:

Reward=$f(\Delta T_{indoor}, \Delta T_{outdoor})$, wherein Reward represents the reward value, $f(\ )$ represents a reward function, $\Delta T_{indoor}$ represents a difference value between the experimental indoor temperature and the experimental setting temperature, $\Delta T_{outdoor}$ represents the difference value between the experimental outdoor temperature and the outdoor temperature under a target working condition; and the set of experimental operating parameters of the air conditioner whose reward value is in a preset scope of the reward value is used as one set of standard operating parameters of the air conditioner.

The operation of calculating the maximum expected benefit of performing the current action in the current state based on the first reward matrix and the Q-learning algorithm includes that the maximum expected benefit is calculated according to the following formula: $Q(s, a) = R(s, a) + \Theta \bullet \max\{Q(s_{next}, a_{next})\}$, wherein s represents the current state, a represents the current action, $s_{next}$ represents a next state, $a_{next}$ represents a next action, R(s, a) represents the first reward matrix, $Q(s_{next}, a_{next})$ represents a maximum expected benefit obtained through performing the action $a_{next}$ under the state $s_{next}$, Q(s, a) represents the maximum expected benefit obtained through performing the action a under the state s, and represents a greedy factor.

The operation of obtaining the target action parameter under the maximum expected benefit includes that the target action parameter is calculated according to the following formula: $Q(s, a) = \max\{Q(s, a_{next})\}$, wherein s represents the current state, $a_{next}$ represents the next action, $Q(s, a_{next})$ represents the maximum expected benefit obtained through performing the action $a_{next}$ under the state s, Q(s, a) represents the maximum expected benefit obtained through performing the action a under the state s; and an operating frequency of the compressor, an opening degree of the electronic expansion valve and a rotating speed of the external fan corresponding to $a_{next}$ under Q(s, a) are taken as the target action parameters.

After controlling the operation of the air conditioner based on the target action parameters, the method further includes the following operation: the parameters of the first reward matrix are modified based on the feedback data, wherein the feedback data is configured to feed back the operation of the air conditioner; and the constraint network model is updated based on the modified first reward matrix whose parameters are modified.

Those skilled in the related art can understand that embodiments of the disclosure can be provided as methods, systems, or computer program products. Therefore, the disclosure can adopt forms of complete hardware embodiments, complete software embodiments or embodiments integrating software and hardware. Moreover, the disclosure can adopt the form of a computer program product implemented on one or more computer available storage media (including but not limited to a disk memory, a Compact Disc Read Only Memory (CD-ROM), an optical memory, etc.) containing computer available program codes.

The disclosure is described with reference to flowcharts and/or block diagrams of the method, the device (system) and the computer program product according to the embodiments of the disclosure. It should be understood that each flow and/or block in the flowchart and/or block diagram, and the combination of the flow and/or block in the flowchart and/or block diagram can be implemented by the computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions can also be stored in the computer-readable memory which can guide the computer or other programmable data processing devices to work in a particular way, so that the instructions stored in the computer-readable memory generate a product including an instruction device. The instruction device implements the specified functions in one or more flows of the flowchart and/or one or more blocks of the block diagram.

These computer program instructions can also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

In a typical configuration, a computing device includes one or more than one Central Processing Unit (CPU), input/output interface, network interface, and memory.

The memory can include a volatile memory, a Random Access Memory (RAM) and/or a nonvolatile memory, and other forms in computer readable media, for example, a Read Only Memory (ROM) or a flash RAM. The memory is an example of the computer readable media.

The computer readable media include permanent and non-permanent, movable and non-movable media that can realize information storage by a variety of ways or technologies. The information can be computer-readable instructions, data structures, modules of a program, or other data. Examples of the computer storage media include: a Phase-Change Memory (PRAM), a Static Random Access Memory (SRAM), a Dynamic Random Access Memory (DRAM), other types of RAM, ROM, and Electrically Erasable Programmable Read-Only Memory (EEPROM), a flash memory or other memory technologies, a CD-ROM, a Digital Video Disk (DVD) or other optical memories and magnetic cassette tapes, magnetic tape disk storage or other magnetic storage devices or a variety of other non-transmission media, which can be configured to store information that can be accessed by the computing device. As defined in the specification, the computer readable media do not include computer-readable transitory media, such as modulated data signals and carriers.

It should be noted that terms "include" and "contain" or any other variant are intended to cover nonexclusive inclusions herein, so that a process, method, goods or device including a series of elements not only includes those elements but also includes other elements which are not clearly listed or further includes elements intrinsic to the process, the method, the goods or the device. Under the condition of no more limitations, an element defined by the statement "including a/an . . . " does not exclude existence of the same other elements in a process, method, goods or device including the element.

Those skilled in the related art can understand that embodiments of the disclosure can be provided as methods, systems, or computer program products. Therefore, the disclosure can adopt forms of complete hardware embodiments, complete software embodiments or embodiments integrating software and hardware. Moreover, the disclosure can adopt the form of a computer program product implemented on one or more computer available storage media (including but not limited to a disk memory, a Compact Disc Read Only Memory (CD-ROM), an optical memory, etc.) containing computer available program codes.

The above is only preferred embodiments of the disclosure and is not intended to limit the disclosure. Those skilled in the related art can make various modifications and variations. Any modifications, equivalent replacements, improvements and the like made within the spirit and principle of the disclosure shall fall within the scope of protection of the disclosure.

What is claimed is:

1. A control method for an air conditioner, comprising:
constructing a first reward matrix according to multiple sets of target operating parameters of an air conditioner, wherein each of the multiple sets of the target operating parameters of the air conditioner at least comprises a target indoor environment temperature, a target outdoor environment temperature, a target setting temperature, a target intermediate temperature of an indoor evaporator, a target intermediate temperature of an outdoor condenser, a first target operating frequency of a compressor, a first target opening degree of an electronic expansion valve and a first target rotating speed of an external fan;
calculating a maximum expected benefit of performing a current action in a current state based on the first reward matrix and a Q-learning algorithm, wherein the current state is represented by a current indoor environment temperature and a current outdoor environment temperature, and the current action is represented by a current operating frequency of the compressor, a current opening degree of the electronic expansion valve and a current rotating speed of the external fan; and
acquiring target action parameters under the maximum expected benefit, and controlling operation of the air conditioner based on second target action parameters, wherein the second target action parameters at least comprise a second target operating frequency of the compressor, a second target opening degree of the electronic expansion valve and a second target rotating speed of the external fan.

2. The control method for the air conditioner according to claim 1, before constructing the first reward matrix according to the multiple sets of the target operating parameters of the air conditioner, further comprising:
collecting air conditioner operating parameters at multiple moments in an actual working condition, wherein the air conditioner operating parameters collected under each of the multiple moments comprise at least one of an indoor environment temperature, an outdoor environment temperature, a setting temperature, an intermediate temperature of the indoor evaporator, an intermediate temperature of the outdoor condenser, an operating frequency of the compressor, an opening degree of the electronic expansion valve and a rotating speed of the external fan; and
performing default parameter filling on the air conditioner operating parameters collected under each of the multiple moments based on a constraint network model, so as to obtain the multiple sets of the target operating parameters of the air conditioner, wherein input of the constraint network model at least comprises the indoor environment temperature, the outdoor environment temperature, the setting temperature, the intermediate temperature of the indoor evaporator and the intermediate temperature of the outdoor condenser, and output of the constraint network model comprises at least the operating frequency of the compressor, the opening degree of the electronic expansion valve and the rotating speed of the external fan.

3. The control method for the air conditioner according to claim 2, before performing the default parameter filling on the air conditioner operating parameters collected under each of the multiple moments based on the constraint network model, so as to obtain the multiple sets of operating parameters of the target air conditioner, further comprising:
constructing a second reward matrix based on multiple sets of standard operating parameters of the air conditioner, wherein the multiple sets of standard operating parameters of the air conditioner are air conditioner operating parameters satisfying a preset condition;
acquiring training set data and validation set data from the second reward matrix;
training a radial basis function neural network model based on the training set data, wherein the radial basis function neural network model comprises an input layer, a hidden layer and an output layer, and the number of neuron in the hidden layer of the radial basis function neural network model is regulated by an objective loss function;
verifying an accuracy rate of the radial basis function neural network model based on the validation set data; and
using the radial basis function neural network model as the constraint network model in a case that the accuracy rate of the radial basis function neural network model is greater than a preset value.

4. The control method for the air conditioner according to claim 3, before constructing the second reward matrix based on the multiple sets of the standard operating parameters of the air conditioner, further comprising:
collecting multiple sets of experimental operating parameters of the air conditioner, wherein each of the multiple sets of the experimental operating parameters of the air conditioner at least comprises an experimental indoor environment temperature, an experimental outdoor environment temperature, an experimental setting temperature, an experimental intermediate temperature of the indoor evaporator, an experimental intermediate temperature of the outdoor condenser, an experimental operating frequency of the compressor, an experimental opening degree of the electronic expansion valve and an experimental rotating speed of the external fan;
calculating a reward value of each of the multiple sets of the experimental operating parameters of the air conditioner according to the following formula:
Reward=$f(\Delta T_{indoor}, \Delta T_{out\ door})$, wherein Reward represents the reward value, f ( ) represents a reward function, $\Delta T_{indoor}$ represents a difference value between the experimental indoor temperature and the experimental setting temperature, $\Delta T_{out\ door}$ represents the difference value between the experimental outdoor temperature and the outdoor temperature under a target working condition; and
taking the set of experimental operating parameters of the air conditioner whose reward value is in a preset scope of the reward value as one set of standard operating parameters of the air conditioner.

5. The control method for the air conditioner according to claim 2, after controlling the operation of the air conditioner based on the target action parameters, further comprising:
modifying parameters of the first reward matrix based on feedback data, wherein the feedback data is configured to feed back the operation of the air conditioner; and
updating the constraint network model based on the modified first reward matrix whose parameters are modified.

6. The control method for the air conditioner according to claim 1, wherein calculating the maximum expected benefit of performing the current action in the current state based on the first reward matrix and the Q-learning algorithm comprises:
calculating the maximum expected benefit according to the following formula:

$$Q(s,a)=R(s,a)+\Theta*\max\{Q(s_{next},a_{next})\}$$

wherein s represents the current state, a represents the current action, $s_{next}$ represents a next state, $a_{next}$ represents a next action, R(s, a) represents the first reward matrix, $Q(s_{next}, a_{next})$ represents a maximum expected benefit obtained through performing the action $a_{next}$ under the state $s_{next}$, Q(s, a) represents the maximum expected benefit obtained through performing the action a under the state s, and $\Theta$ represents a greedy factor.

7. The control method for the air conditioner according to claim 6, wherein obtaining the target action parameter under the maximum expected benefit comprises:
calculating the target action parameter according to the following formula:

$$Q(s,a)=\max\{Q(s,a_{next})\}$$

wherein s represents the current state, $a_{next}$ represents the next action, Q(S, $a_{next}$) represents the maximum expected benefit obtained through performing the action $a_{next}$ under the state s, Q(s, a) represents the maximum expected benefit obtained through performing the action a under the state s; and
taking an operating frequency of the compressor, an opening degree of the electronic expansion valve and a rotating speed of the external fan corresponding to $a_{next}$ under Q(s, a) as the target action parameters.

8. A storage medium, comprising a stored program, wherein the program executes the control method for the air conditioner according to claim 1.

9. The storage medium according to claim 8, before constructing the first reward matrix according to the multiple sets of the target operating parameters of the air conditioner, the control method for the air conditioner further comprising:
collecting air conditioner operating parameters at multiple moments in an actual working condition, wherein the air conditioner operating parameters collected under each of the multiple moments comprise at least one of an indoor environment temperature, an outdoor environment temperature, a setting temperature, an intermediate temperature of the indoor evaporator, an intermediate temperature of the outdoor condenser, an operating frequency of the compressor, an opening degree of the electronic expansion valve and a rotating speed of the external fan; and
performing default parameter filling on the air conditioner operating parameters collected under each of the multiple moments based on a constraint network model, so as to obtain the multiple sets of the target operating parameters of the air conditioner, wherein input of the constraint network model at least comprises the indoor environment temperature, the outdoor environment temperature, the setting temperature, the intermediate temperature of the indoor evaporator and the intermediate temperature of the outdoor condenser, and output of the constraint network model comprises at least the operating frequency of the compressor, the opening degree of the electronic expansion valve and the rotating speed of the external fan.

10. The storage medium according to claim 9, before performing the default parameter filling on the air conditioner operating parameters collected under each of the multiple moments based on the constraint network model, so as to obtain the multiple sets of operating parameters of the target air conditioner, the control method for the air conditioner further comprising:
constructing a second reward matrix based on multiple sets of standard operating parameters of the air conditioner, wherein the multiple sets of standard operating parameters of the air conditioner are air conditioner operating parameters satisfying a preset condition;
acquiring training set data and validation set data from the second reward matrix;
training a radial basis function neural network model based on the training set data, wherein the radial basis function neural network model comprises an input layer, a hidden layer and an output layer, and the number of neuron in the hidden layer of the radial basis function neural network model is regulated by an objective loss function;
verifying an accuracy rate of the radial basis function neural network model based on the validation set data; and
using the radial basis function neural network model as the constraint network model in a case that the accuracy rate of the radial basis function neural network model is greater than a preset value.

11. The storage medium according to claim 10, before constructing the second reward matrix based on the multiple sets of the standard operating parameters of the air conditioner, the control method for the air conditioner further comprising:
collecting multiple sets of experimental operating parameters of the air conditioner, wherein each of the multiple sets of the experimental operating parameters of the air conditioner at least comprises an experimental indoor environment temperature, an experimental outdoor environment temperature, an experimental setting temperature, an experimental intermediate temperature of the indoor evaporator, an experimental intermediate temperature of the outdoor condenser, an experimental operating frequency of the compressor, an experimental opening degree of the electronic expansion valve and an experimental rotating speed of the external fan;
calculating a reward value of each of the multiple sets of the experimental operating parameters of the air conditioner according to the following formula:
Reward=f ($\Delta T_{indoor}$, $\Delta T_{out\ door}$), wherein Reward and represents the reward value, f ($\square$ represents a reward function, $\Delta T_{indoor}$ represents a difference value between the experimental indoor temperature and the experimental setting temperature, $\Delta T_{out\ door}$ represents the difference value between the experimental outdoor temperature and the outdoor temperature under a target working condition; and
taking the set of experimental operating parameters of the air conditioner whose reward value is in a preset scope of the reward value as one set of standard operating parameters of the air conditioner.

12. The storage medium according to claim 8, wherein calculating the maximum expected benefit of performing the current action in the current state based on the first reward matrix and the Q-learning algorithm comprises:
calculating the maximum expected benefit according to the following formula:

$$Q(s,a)=R(s,a)+\Theta^*\max\{Q(s_{next},a_{next})\}$$

wherein s represents the current state, a represents the current action, $s_{next}$ represents a next state, $a_{next}$ represents a next action, R(s, a) represents the first reward matrix, $Q(s_{next}, a_{next})$ represents a maximum expected benefit obtained through performing the action $a_{next}$ under the state $s_{next}$, Q(s, a) represents the maximum expected benefit obtained through performing the action a under the state s, and $\square$ represents a greedy factor.

13. The storage medium according to claim 12, wherein obtaining the target action parameter under the maximum expected benefit comprises:
calculating the target action parameter according to the following formula:

$$Q(s,a)=\max\{Q(s,a_{next})\}$$

wherein s represents the current state, $a_{next}$ represents the next action, Q(s, $a_{next}$) represents the maximum expected benefit obtained through performing the action $a_{next}$ under the state s, Q(s, a) represents the maximum expected benefit obtained through performing the action a under the state s; and
taking an operating frequency of the compressor, an opening degree of the electronic expansion valve and a rotating speed of the external fan corresponding to $a_{next}$ under Q(s, a) as the target action parameters.

14. The storage medium according to claim 8, after controlling the operation of the air conditioner based on the target action parameters, the control method for the air conditioner further comprising:

modifying parameters of the first reward matrix based on feedback data, wherein the feedback data is configured to feed back the operation of the air conditioner; and updating the constraint network model based on the modified first reward matrix whose parameters are modified.

15. A control device for an air conditioner, comprising:

a first constructing unit, configured to construct the first reward matrix according to the multiple sets of the target operating parameters of the air conditioner, wherein each of the multiple sets of the target operating parameters of the air conditioner at least comprises the target indoor environment temperature, the target outdoor environment temperature, the target setting temperature, the target intermediate temperature of the indoor evaporator, the target intermediate temperature of the outdoor condenser, the first target operating frequency of the compressor, the first target opening degree of the electronic expansion valve and the first target rotating speed of the external fan;

a first calculating unit, configured to calculate the maximum expected benefit of performing the current action in the current state based on the first reward matrix and the Q-learning algorithm, wherein the current state is represented by the current indoor environment temperature and the current outdoor environment temperature, and the current action is represented by the current operating frequency of the compressor, the current opening degree of the electronic expansion valve and the current rotating speed of the external fan; and a first acquiring unit, configured to acquire the target action parameters under the maximum expected benefit, and controlling operation of the air conditioner based on the second target action parameters, wherein the second target action parameters at least comprise the second target operating frequency of the compressor, the second target opening degree of the electronic expansion valve and the second target rotating speed of the external fan.

\* \* \* \* \*